United States Patent
Kann et al.

(10) Patent No.: US 6,997,776 B2
(45) Date of Patent: Feb. 14, 2006

(54) PROCESS FOR PRODUCING A SEMICONDUCTOR WAFER

(75) Inventors: Gunther Kann, Griesstätt (DE); Manfred Thurner, Ach (AT); Karl-Heinz Wajand, Ach (AT); Armin Deser, Burghausen (DE); Markus Schnappauf, Rosenheim (DE)

(73) Assignee: Siltronic AG, Munich (DE)

( * ) Notice: Subject to any disclaimer, the term of this patent is extended or adjusted under 35 U.S.C. 154(b) by 0 days.

(21) Appl. No.: 11/044,595

(22) Filed: Jan. 27, 2005

(65) Prior Publication Data

US 2005/0170749 A1   Aug. 4, 2005

(30) Foreign Application Priority Data

Jan. 29, 2004   (DE) ..................... 10 2004 004 556

(51) Int. Cl.
    *B24B 1/00*   (2006.01)
(52) U.S. Cl. ............................. 451/5; 451/285; 451/41; 451/290; 438/626; 438/631; 438/691; 438/706; 148/33
(58) Field of Classification Search .................... 451/5, 451/8, 41, 285–290; 438/626, 631, 691, 438/706, 689, 690, 471, 745, 692, 755; 148/33
    See application file for complete search history.

(56) References Cited

U.S. PATENT DOCUMENTS

| | | | | |
|---|---|---|---|---|
| 3,691,694 A | | 9/1972 | Goetz et al. | |
| 4,390,392 A | * | 6/1983 | Robinson et al. | 438/473 |
| 5,422,316 A | * | 6/1995 | Desai et al. | 438/693 |
| 5,700,179 A | * | 12/1997 | Hasegawa et al. | 451/41 |
| 5,756,399 A | * | 5/1998 | Hajime et al. | 438/692 |
| 5,800,725 A | * | 9/1998 | Kato et al. | 216/88 |
| 5,942,445 A | * | 8/1999 | Kato et al. | 438/691 |
| 6,458,688 B1 | | 10/2002 | Wenski et al. | |

FOREIGN PATENT DOCUMENTS

EP   0 208 315   7/1986

OTHER PUBLICATIONS

English Abstract of European Appln. No. 0 208 315.

* cited by examiner

*Primary Examiner*—Lee D. Wilson
*Assistant Examiner*—Anthony Ojini
(74) *Attorney, Agent, or Firm*—Brooks Kushman P.C.

(57) ABSTRACT

The invention relates to a process for producing a semiconductor wafer by simultaneous polishing of a front surface and a back surface of the semiconductor wafer with a polishing fluid between rotating polishing plates during a polishing run which lasts for a polishing time, the semiconductor wafer being located in a cutout in a carrier having a defined carrier thickness and being held on a defined geometric path, the semiconductor wafer having a starting thickness prior to polishing and a final thickness after polishing. The polishing time for the polishing run is calculated from data which include the starting thickness of the semiconductor wafer and the carrier thickness as well as the starting thickness and final thickness and the flatness of a semiconductor wafer which was polished during a polishing run preceding the present polishing run.

7 Claims, 1 Drawing Sheet

PROCESS FOR PRODUCING A SEMICONDUCTOR WAFER

BACKGROUND OF THE INVENTION

1. Field of the Invention

The invention relates to a process for producing a flat semiconductor wafer for the semiconductor industry, in particular for fabricating electronic components with line widths of less than or equal to 0.13 µm.

2. Background Art

Semiconductor wafers which are suitable for the fabrication of electronic components with line widths of less than or equal to 0.13 µm must meet a large number of demanding property parameters. One especially important parameter is the geometry of the semiconductor wafer, which is to be understood as meaning, in particular, the flatness and the plane-parallelism of the faces of the semiconductor wafer. Some of the specification parameters describing the flatness can be categorized on the basis of the lateral extent of potential interference effect relating to it. In this context, a general distinction is drawn between global flatness (lateral extent in the region of the diameter of the semiconductor wafer/vertical deviation from an ideally flat surface), local flatness (lateral extent in the cm range/vertical effect in the 100 nm range), nanotopography (lateral mm range/vertical 10 nm range) and surface roughness (lateral µm range/vertical sub-nm range).

The definitive flatness of a semiconductor wafer is generally produced by a polishing process. Apparatuses and processes for the simultaneous polishing of front and back surfaces of semiconductor wafers have been provided and further developed with a view to improving the flatness parameters of a semiconductor wafer. Such double-side polishing is described, for example, in U.S. Pat. No. 3,691,694. In accordance with an embodiment of double-side polishing in EP 208 315 B1, semiconductor wafers in carriers made from metal or plastic having suitably dimensioned cutouts are moved between two rotating polishing plates, which are covered with a polishing cloth, along a path predetermined by the machine and process parameters, in the presence of a polishing fluid, and are thereby polished. In the relevant literature, carriers are also referred to as templates. To enable the compressive forces which are employed during double-side polishing to act preferentially on the semiconductor wafer that is to be polished and not on the carrier, the final thickness of semiconductor wafers which have been double-side polished in accordance with prior art is significantly greater than the thickness of the carriers used. U.S. Pat. No. 6,458,688 describes a process in which the thickness of the carriers, the thickness of the semiconductor wafers and the removal of material brought about by the polishing are maintained in a specific relationship in order to obtain particularly flat semiconductor wafers whose local geometry values are below a required threshold value and which do not differ significantly in an edge region of the semiconductor wafer from those in a center region.

SUMMARY OF THE INVENTION

Figure 1:
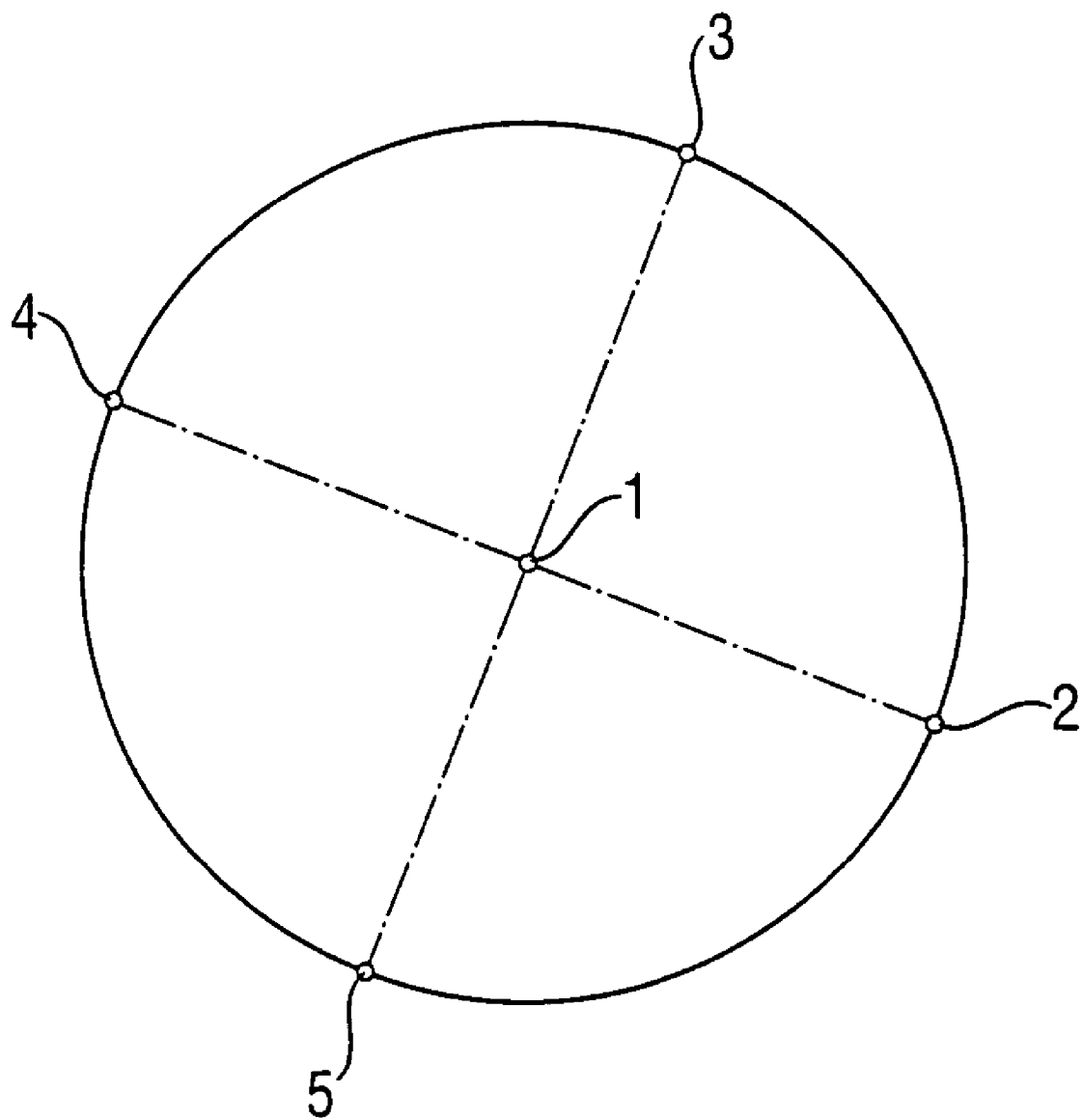
FIG. 1 illustrates measurement points for determining wafer dnl35 values.

It is an object of the present invention to stabilize the double-side polishing of semiconductor wafers and thereby to minimize loss in yield caused by process fluctuations. This and other objects are attained by a process for producing a semiconductor wafer by simultaneous polishing of a front surface and a back surface of the semiconductor wafer between rotating polishing plates, with a polishing fluid being supplied, during a polishing run which lasts for a polishing time, the semiconductor wafer being located in a cutout in a carrier and maintained on a defined geometric path, the carrier having a defined carrier thickness, and the semiconductor wafer having a starting thickness prior to polishing and a final thickness after polishing, wherein the polishing time for the polishing run is calculated from data which include the starting thickness and the carrier thickness as well as the starting thickness and final thickness and the flatness of a semiconductor wafer which was polished during a polishing run which occurred prior to the present polishing run.

An essential feature of the invention is that the polishing time of a current polishing run is based on the profile of a preceding polishing run, preferably the immediately proceeding run, with the carrier thickness at the start of the preceding polishing run and of the current polishing run, the starting and final thicknesses of the semiconductor wafers polished in the preceding polishing run and the geometry values thereof after polishing has taken place, being the defining factors. The yields of semiconductor wafers with a predetermined flatness are considerably higher with the process according to the invention than with a similar type of process in which each polishing run is carried out with the same, predetermined polishing time.

The starting material for the process is a semiconductor wafer which has been conventionally separated from a crystal, for example from a silicon single crystal which has been cut to length, cylindrically ground, and the front and/or back wafer surface of which has been machined by means of a lapping or surface grinding step. It is also possible for the edge of the semiconductor wafer to be rounded and if appropriate polished at a suitable point in the process sequence by means of a suitably profiled grinding wheel. Moreover, it is possible for the surface of the semiconductor wafers to be etched following the grinding step.

The end product of the process is a double-side polished semiconductor wafer which satisfies the requirements imposed on semiconductor wafers as starting materials for semiconductor component processes with line widths of less than or equal to 0.13 µm and is superior in terms of production costs to the semiconductor wafers produced in accordance with prior art, on account of improved yields.

In principle, the carriers used in the process according to the invention can be made from any material. Carriers made from steel or from fiber-reinforced plastic are preferred; carriers made from stainless chromium steel are particularly preferred.

In the case of semiconductor wafers made from silicon, the starting thickness of the semiconductor wafers to be polished is preferably 20 to 200 µm greater than the carrier thickness, with a range of from 30 to 70 µm being particularly preferred, and the final thickness of the polished semiconductor wafers is preferably 2 to 20 µm greater than the carrier thickness, with a range of from 5 to 15 µm being particularly preferred. The amount of material removed by the polishing step is preferably from 5 to 100 µm, more preferably 10 µm to 60 µm, and most preferable from 20 to 50 µm.

After the polishing has finished, any adhering polishing fluid is cleaned off the semiconductor wafers, which are then dried and their flatness can subsequently be measured on a commercially available, for example capacitively or optically operating, geometry-measuring apparatus.

The process according to the invention is preferably used to produce semiconductor wafers made from silicon, silicon/germanium, silicon nitride, gallium arsenide and further III–V semiconductors. Silicon in single-crystal form, for example crystallized by a Czochralski process or a float zone process, is particularly preferred.

The semiconductor wafers have diameters of preferably 200 mm, 300 mm, 400 mm and 450 mm and preferably have thicknesses of a few hundred μm to a few cm, preferably from 400 μm to 1200 μm. In addition to the production of semiconductor wafers from a homogeneous material, the invention can also be used to produce semiconductor substrates of multilayer structure, such as SOI (silicon-on-insulator) wafers and what are known as bonded wafers.

The process is described in more detail on the basis of the example of a silicon wafer which is to be polished by double-side polishing. The silicon wafer, together with other wafers, is polished during a polishing run which lasts for a defined polishing time in accordance with the process described in U.S. Pat. No. 6,458,688; the polishing time is preferably calculated automatically. The calculation involves the use of data such as the thicknesses of the carriers used and the starting and final thicknesses of the semiconductor wafers polished in the last polishing run before the current polishing run.

An additional factor in calculation is a value measured on these semiconductor wafers, which describes the flatness of the semiconductor wafers. This value is preferably the dnl35 value, which characterizes the global flatness in a simple way. The polishing time of the first polishing run is predetermined without any such calculation, for example on the basis of results of tests. When calculating the polishing time for a subsequent polishing run, it is preferable to use the following, preferred example.

EXAMPLE

A computer which automatically predetermines the polishing time uses the following data A to G to calculate the polishing time, where A denotes the thickness of the semiconductor wafer at the start of the preceding polishing run;

B denotes the thickness of the semiconductor wafer at the end of the preceding polishing run;

C denotes the polishing time of the preceding polishing run;

D denotes the thickness of the carrier at the start of the preceding polishing run;

E denotes the dnl35 value measured on a semiconductor wafer polished during the preceding polishing run;

F denotes the thickness of the semiconductor wafer at the start of the current polishing run, and G denotes the thickness of the carrier at the start of the current polishing run.

With regard to the flatness consideration which is incorporated in the calculation of the polishing time, the computer uses a correction factor K which adopts the following levels on the basis of the dnl35 value (E) measured:

for dnl35>0.7 μm, K=+1 μm
for dnl35 0.5 to 0.7, K=+0.5 μm
for dnl35 0.15 to 0.5, K=0 (optimum range)
for dnl35 0.05 to 0.15, K=−0.5 μm
for dnl35<0.05, K=−1 μm The polishing time for the current polishing run may be calculated on the basis of the following formula, in which the letters have the meanings described above:

$$\text{polishing time} = [F - G - \{(B - D) + K\}]/[(A - B)/C]$$

Assuming a constant thickness of the carriers and a constant initial thickness of the semiconductor wafer, this results in particular in the following consequences:

if the dnl35 value is too high (positive) with respect to the optimum range, the polishing time of the polishing run needs to be reduced compared to the polishing time of the preceding polishing run;

if the dnl35 value is too low or even negative with respect to the optimum range, the polishing time needs to be increased;

if the dnl35 value is in the optimum range, the polishing time should be maintained. Other formulas which provide similar results based on one or more preceding runs may of course be devised.

The dnl35 value is the result of a differential measurement of the thickness of the semiconductor wafer at certain selected locations in the edge region and in the center of the semiconductor wafer. These are marked by reference numbers in the figure. Four locations, marked by points 2 to 5, are in each case offset by 90° with respect to the adjacent point and distributed over the circumference in the edge region of the semiconductor wafer. Even-numbered points are located opposite one another, as are odd-numbered points. Point 1 denotes the location in the center of the semiconductor wafer. The dnl35 value can be calculated as follows:

$$dnl35 = (\text{thickness3} - \text{thickness5})/2 - \text{thickness1}$$

In the above, thickness followed by a number defines the thickness of the semiconductor wafer at a location represented by the designated point.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for producing a semiconductor wafer by simultaneous polishing of a front surface and a back surface of the semiconductor wafer with a polishing fluid between rotating polishing plates during a polishing run which lasts for a polishing time, the semiconductor wafer being located in a cutout in a carrier having a defined carrier thickness and being maintained on a defined geometric path, the semiconductor wafer having a starting thickness prior to polishing and a final thickness after polishing, wherein the polishing time for the polishing run is calculated from data which include the starting thickness of the semiconductor wafer and the carrier thickness as well as the starting thickness and final thickness and the flatness of a semiconductor wafer which was polished during a polishing run preceding the present polishing run.

2. The process of claim 1, wherein said preceding polishing run is the run just prior to the present polishing run.

3. The process as claimed in claim 1, wherein the flatness is incorporated in the calculation in the form of the dnl35 value.

4. The process of claim 3, wherein polishing time is reduced proportional to the absolute magnitude of a positive dnl35 value.

5. The process of claim 4, wherein the reduction in polishing time takes place in increments.

6. The process of claim 3, wherein polishing time is increased proportional to the absolute magnitude of a negative dnl35 value.

7. The process of claim 6, wherein the increase in polishing time takes place in increments.

* * * * *